United States Patent [19]

Nagata et al.

[11] Patent Number: 4,677,657
[45] Date of Patent: Jun. 30, 1987

[54] VOICE RECORDING CARD

[75] Inventors: Masanori Nagata, Kyoto; Shinya Yoshida, Takatsuki; Susumu Yamashita, Osaka, all of Japan

[73] Assignee: Omron Tateisi Electronics Co., Kyoto, Japan

[21] Appl. No.: 935,168

[22] Filed: Nov. 26, 1986

Related U.S. Application Data

[63] Continuation of Ser. No. 761,035, Jul. 31, 1985, abandoned.

[30] Foreign Application Priority Data

Jul. 31, 1984 [JP] Japan .............................. 59-162631

[51] Int. Cl.⁴ ............................................ H04Q 7/04
[52] U.S. Cl. ..................................... 379/63; 155/89; 155/90; 379/88; 379/144; 379/357; 379/91; 340/825.34; 235/380; 235/381
[58] Field of Search .................... 179/2 E, 2 EA, 2 B, 179/2EC, 2 DP, 2 CA, 6.3 CC, 6.3 MA, 178; 381/51; 340/825.33, 825.3 V, 309.15; 368/63, 41; 235/492, 493, 380, 381; 455/89, 90

[56] References Cited

U.S. PATENT DOCUMENTS

| | | | |
|---|---|---|---|
| 3,752,904 | 8/1973 | Waterbury | 179/2 CA |
| 4,007,355 | 2/1977 | Moreno | 235/492 |
| 4,162,610 | 7/1979 | Levine | 58/148 |
| 4,302,752 | 11/1981 | Weitzler | 340/309.15 |
| 4,384,288 | 5/1983 | Walton | 340/825.34 |
| 4,397,562 | 8/1983 | Shirasu | 368/83 |
| 4,406,549 | 9/1983 | Takahashi | 368/63 |
| 4,481,382 | 11/1984 | Villa-Reav | 179/2 EA |
| 4,529,870 | 7/1985 | Chaum | 235/280 |
| 4,548,511 | 10/1985 | Yabe | 368/10 |
| 4,550,248 | 10/1985 | Hoppe et al. | 235/492 |
| 4,575,621 | 3/1986 | Dreifus | 235/380 |

Primary Examiner—Robert Lev
Attorney, Agent, or Firm—Schwartz, Jeffery, Schwaab, Mack, Blumenthal & Evans

[57] ABSTRACT

A voice recording card (1) can record and reproduce a message and when it is inserted into a transmitting and receiving apparatus (3), it can transmit and receive the message. In a recording mode, the message is applied through a microphone (14), converted into a digital signal by an analog/digital converter (21) and is recorded in a memory (22). In a transmission mode, the content of the message is read out from the memory (22) and is transmitted through an interface (24) to the transmitting and receiving apparatus (3). In a receiving mode, the content of the message received by the transmitting and receiving apparatus (3) is recorded in the memory (22) through the interface (24) and is read out, in a reproduction mode, from the memory (22) and converted into an analog signal by a digital-analog converter (23) to be outputted from a speaker (15). The card (1) comprises a central processing unit which controls an electric structure of the card (1) in response to the mode designated by a mode designation key included in a keyboard (13).

15 Claims, 16 Drawing Figures

VOICE RECORDING CARD

This application is a continuation of application Ser. No. 761,035, filed July 31, 1985, now abandoned.

BACKGROUND OF THE INVENTION

1. Field of the Invention

The present invention relates to a voice recording card and particularly to a voice recording card capable of recording a message and the like, which is inserted into a transmitting and receiving apparatus such as a telephone so that a message is transmitted and received.

2. Description of the Prior Art

In the prior art there is no system for transmission of a message by connecting a card where the recorded message is used with a transmitting and receiving apparatus such as a telephone. As a device similar to this, a telephone message recorder is known. In such a telephone message recorder, a message for example that the person expected to answer the phone call is not at home has been recorded in advance in a magnetic tape and when a phone call is made, the recorded message is transmitted to the person making the phone call and a message from this person is recorded. Thus, such a telephone message recorder operates only when a call is made from the other party. In another example, a message has been recorded in advance in a conventional recorder and at the time of making a phone call the handset of the telephone is put close to the recorder reproducing the message and thus the message can be transmitted. However, this case does not adopt a system for transmitting an electric signal from the recorder directly to the telephone.

It sometimes happens that when one wants to give a message to his family or to his friend by telephone, the message cannot be transmitted because a public telephone is used by someone else or the person whom the call is made is not at home. In addition, there is a case in which it is sufficient to leave a message and one does not want to talk with the other party. Such inconveniences concerning the telephone are more or less experienced by everyone. Therefore, a system has been desired in which a message can be automatically given to the person to whom a phone call is made even if that person is out, for example, at the time of the call.

SUMMARY OF THE INVENTION

Accordingly, a primary object of the present invention is to provide a new record medium which can be used in such a system and by which a message and the like can be recorded.

The present invention is a voice recording card for use in a transmitting and receiving apparatus, this voice recording card comprising: a recording mode designating key for designating a voice recording mode; voice input converting means being enabled in response to an input by the recording mode designating key for converting voice input information to an electric signal; storing means for storing the voice information from the voice input converting means; and interface means provided for the purpose of transmitting the information stored in the storing means and having a transmitting contact to be connected with the transmitting and receiving apparatus.

The above stated card may further comprise analog-to-digital converting means for converting an analog signal entered by the voice input converting means to a digital signal and in this case, the storing means may be a digital integrated circuit memory. Further, for the purpose of recording into the above stated card, the information received based on the reception of the information from the above stated transmitting and receiving apparatus, the above stated interface means may be adapted to make a bidirectional communication of the information between the storing means and the transmitting and receiving apparatus so that the information received via the interface means from the transmitting and receiving apparatus can be stored in the above stated storing means. In that case, in order to reproduce as aural information, the digital information stored in the storing means, the above stated card comprises: a reproduction mode designating key for designating a reproduction mode; digital-to-analog converting means being enabled in response to an input by the reproduction mode designating key for converting the digital data stored in the storing means to an analog electric signal; and voice output converting means for reproducing the converted analog electric signal as a voice. The above stated card may further comprise a transmission mode designating key for designating a transmission mode and a receiving mode designating key for designating a receiving mode. Further, the above stated card may comprise control means for making control so that the above stated respective means perform functionally recording, transmitting, receiving and reproducing operations corresponding to the designated modes.

In operation, when an input is applied by means of the recording mode designating key, the voice input converting means is enabled. The information entered from the voice input means is converted to digital data by the analog-to-digital converting means and the digital data is stored in the storing means. In response to an input by the transmission mode designating key, the data stored in the storing means is transmitted to the transmitting and receiving apparatus via the contact of the interface means. In response to an input by the receiving mode designating key, the data received by the transmitting and receiving means is stored in the storing means via the contact of the interface means. When an input is applied by means of the reproduction mode designating key, the data stored in the storing means is converted to an analog electric signal by the digital-to-analog converting means and the analog electric signal is further converted to an aural signal by the voice output converting means whereby the aural signal is reproduced. The control means controls the above stated respective means to perform recording, transmitting, receiving and reproducing operations in response to the inputs by the above stated respective keys.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
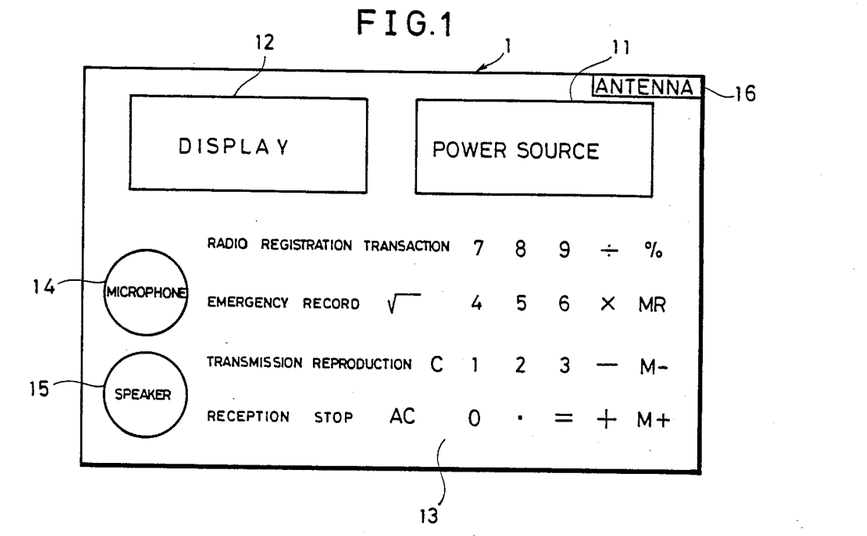
FIG. 1 shows the appearance of the front surface of a card of an embodiment of the present invention.

FIG. 1 shows the appearance of the front surface of a card in accordance with an embodiment of the present invention. On the front surface of the card 1, there are provided a power source portion 11, a display 12, a keyboard 13, a microphone 14, a speaker 15 and an antenna 16. The power source portion 11 comprises, for example, a solar battery or a dry battery. The display 12 comprises a liquid crystal film or the like, where the input content, the result of calculation, the guidance for key operation and other information are displayed. The keyboard 13 has a ten key, calculation keys and mode designating function keys. The mode designating function keys include a radio mode designating key for designating a radio communication mode for radio communication in case of emergency and the like, a registration mode designating key for designating a registration mode for registering a telephone number and the like in a memory of the card, a transaction mode designating key for designating a transaction mode for transaction processing by an automatic teller machine at a bank for example, and an emergency mode designating key for designating an emergency mode for transmitting a call signal to the card of the other party in case of emergency. The mode designating function keys further include a recording mode designating key for designating a voice recording mode at the time of recording, a reproduction mode designating key for designating a reproduction mode at the time of reproducing the recorded content, a transmission mode designating key for designating a transmission mode at the time of transmission from the card and a receiving mode designating key for designating a receiving mode at the time of reception, as well as a stop key for stopping the operations designated by the above stated function keys. These keys are formed preferably as touch keys. The microphone 14 enters a message and the like into the memory of the card 1. The speaker 15 converts the content of the memory of the card 1 to a voice or generates a call sound in response to a call by radio. The antenna 16 receives a radio wave of an emergency call and the like or transmits and receives radio communication. The dimensions of the card 1 in the vertical and horizontal directions are almost the same as those of a bank card or a credit card and the card 1 has a thickness enough to contain the microphone 14 and the speaker 15.

Figure 2:
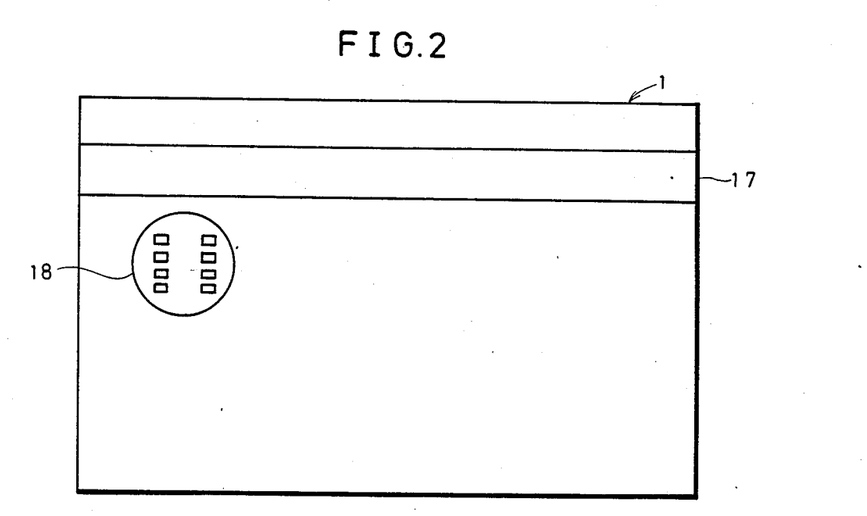
FIG. 2 shows the appearance of the back surface of the card shown in FIG. 1.

FIG. 2 shows the back surface of the card 1. On the back surface of the card 1, a magnetic stripe 17 and a contact 18 are provided. The magnetic stripe 17 is the same as a magnetic stripe provided in a conventional cash card or credit card. The contact 18 enables the communication between the card 1 and an external apparatus when the card 1 is inserted into a card entrance of a transmitting and receiving apparatus serving also as a telephone to be described later and comes in touch with a contact element in the transmitting and receiving apparatus. Further, the magnetic stripe 17 or the contact 18 thus provided in the card 1 makes it possible to use this card in an automatic teller machine of a bank whereby transaction processing can be performed.

Figure 3:
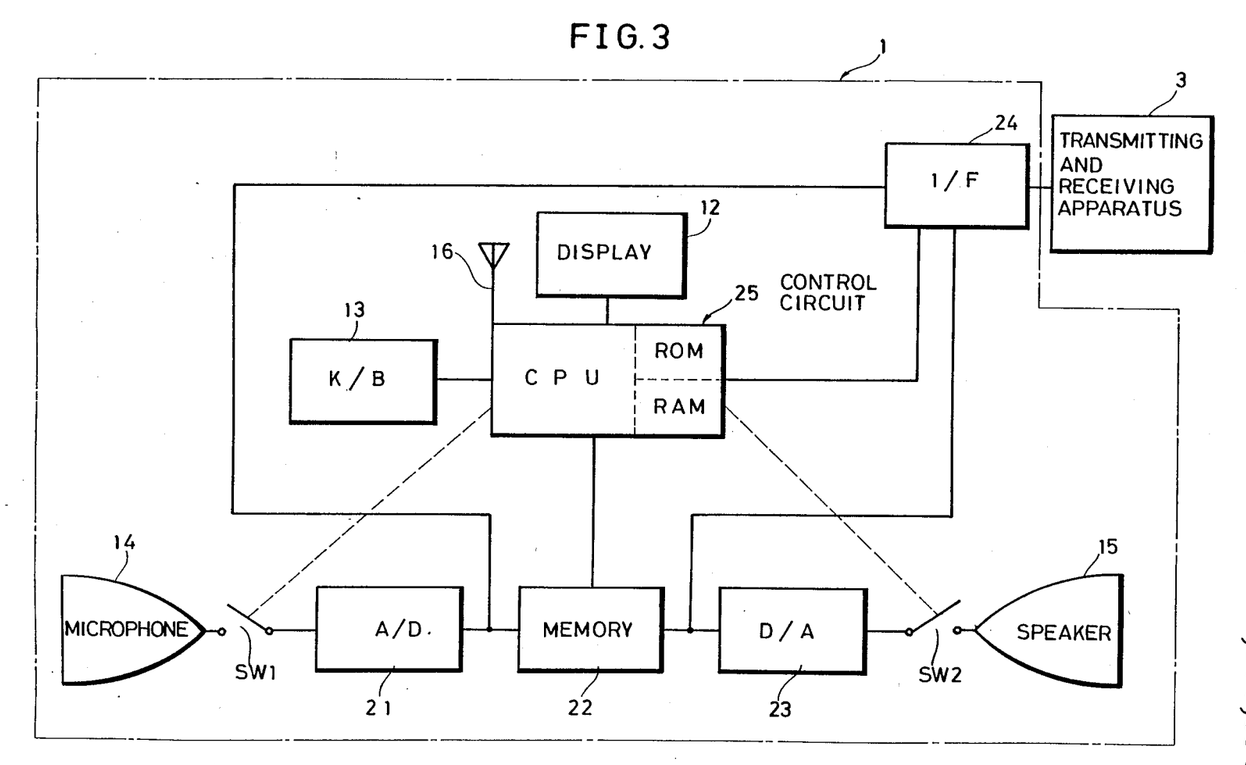
FIG. 3 is a schematic block diagram where a card of an embodiment of the present invention is adapted to communicate with an external transmitting and receiving apparatus in the form of digital data.

FIG. 3 is a schematic block diagram of the card 1, showing a state where the card 1 is connected to the transmitting and receiving apparatus 3. The display 12 and the keyboard 13 shown in FIG. 1 are connected to a CPU of a control circuit 25. The microphone 14 is connected to an A-D (analog-to-digital) converter 21 via a switch SW1 and the speaker 15 is connected to a D-A (digital-to-analog) converter 23 via a switch SW2. The A-D converter 21 and the D-A converter 23 are both connected to an memory 22 and an interface 24. The A-D converter 21 converts analog data such as a message entered through the microphone 14 to digital data, which is stored in the memory 22. The D-A converter 23 converts the digital data stored in the memory 22 to analog data, which can be reproduced as a voice from the speaker 15. The switch SW1 and the switch SW22 operate under the control of the control circuit 25. Since the memory 22 is connected to the interface 24 and the interface 24 is connected to the transmitting and receiving apparatus 3 via the contact 18, the digital data stored in the memory 22 can be transmitted through the transmitting and receiving apparatus 3 or the data received by the transmitting and receiving apparatus 3 can be received and stored in the memory 22. In this case, the data communicated between the interface 24 and the transmitting and receiving apparatus 3 is digital data. The memory 22 and the interface 24 are connected to the control circuit 25 so as to be controlled by the CPU of the control circuit 25. The antenna 16 shown in FIG. 1 is connected to the control circuit 25. The control circuit 25 contains a ROM, a RAM and the CPU. The ROM stores programs for controlling an electronic circuit shown in FIG. 3, performing calculation or transaction processing. The power source portion 11 shown in FIG. 1 supplies electric power to the electronic circuit of the card 1, shown in FIG. 3, though not shown in FIG. 1. Preferably, the electronic circuit shown in FIG. 3 is an integrated circuit so that the card itself may be compact.

Table 1 shows relation between the states of the switches SW1 and SW2 and the modes of the memory 22 in the case shown in the schematic block diagram of FIG. 3.

TABLE 1

|  | SW1 | Memory | SW2 |
|---|---|---|---|
| Recording | ON | Writing | OFF |
| Transmission | OFF | Reading | OFF |
| Receiving | OFF | Writing | OFF |
| Reproduction | OFF | Reading | ON |

In the recording mode, the control circuit 25 turns on the switch SW1, brings the memory 22 into the writing mode and turns off the switch SW2. As a result, the voice input information is converted to an analog electric signal through the microphone 14 and the analog electric signal is converted by the A-D converter to a digital signal, which is written in the memory 22. In the transmission mode, the control circuit 25 makes the switch SW1 turned off, the memory 22 brought into the reading mode and the switch SW2 turned off. Thus, the data stored in the memory 22 is read out from the memory 22 and transmitted to the transmitting and receiving apparatus 3 via the interface 24. In the receiving mode, the control circuit 25 makes the switch SW1 turned off, the memory 22 brought into the writing mode and the switch SW2 turned off. Thus, the data received by the transmitting and receiving apparatus 3 is written in the memory 22 via the interface 24. In the reproduction mode, the control circuit 25 makes the switch SW1 turned off, the memory 22 brought into the reading mode and the switch SW2 turned on. As a result, the digital data stored in the memory 22 is read out from the memory 22 and converted to an analog signal by the D-A converter 23 so as to be reproduced as aural information from the speaker 15.

Figure 4:
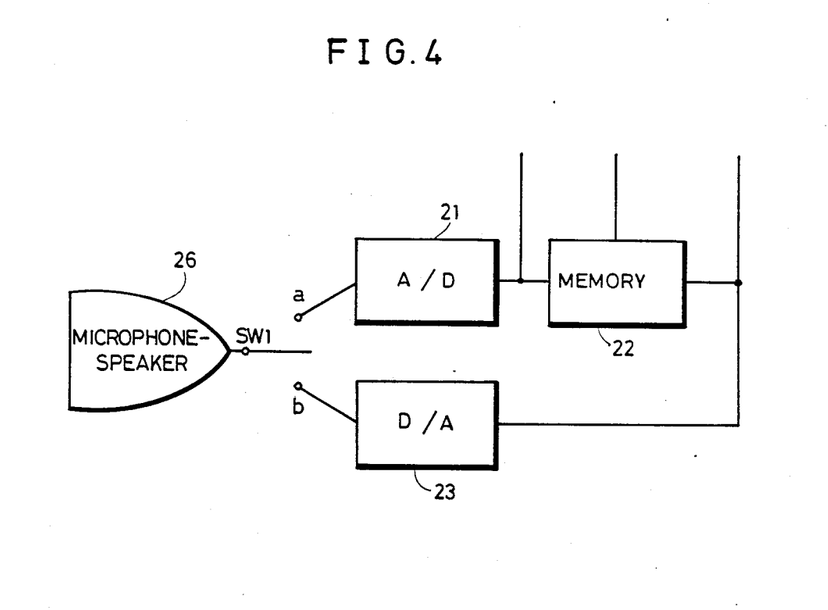
FIG. 4 shows an example in which the microphone and the speaker shown in FIG. 3 are combined as a single body.

FIG. 4 represents an embodiment in the case where the microphone 14 and the speaker 15 shown in FIG. 3 are combined as a single body. The microphone-speaker 26 has both functions as a microphone and a speaker. An aural signal entered through the microphone-speaker 26 is converted to digital data by the A-D converter 21 so as to be stored in the memory 22. On the other hand, the digital data received via the interface 24 from the transmitting and receiving apparatus 3 and stored in the memory 22 is converted to an analog signal by the D-A converter 23 so as to be reproduced as a voice from the microphone-speaker 26. Table 2 shows relation between the states of the switch SW1 and the modes of the memory 22 in the case shown in the schematic block diagram of FIG. 4.

TABLE 2

|  | SW1 | Memory |
|---|---|---|
| Recording | a ON | Writing |
| Transmission | OFF | Reading |
| Receiving | OFF | Writing |
| Reproduction | b ON | Reading |

In the recording mode, the control circuit 25 connects the switch SW1 to the terminal (a) of FIG. 4 and brings the memory 22 into the writing mode. Thus, voice input information is converted to an analog electric signal through the microphone-speaker 26 and the analog electric signal is converted by the A-D converter to a digital signal, which is written in the memory 22. In the transmission mode, the control circuit 25 turns off the switch SW1 and changes the mode of the memory 22 to the reading mode. In consequence, the data stored in the memory 22 is read out from the memory 22 and transmitted to the transmitting and receiving apparatus 3 via the interface 24. In the receiving mode, the control circuit 25 makes the switch SW1 turned off and the memory 22 brought into the writing mode. In consequence, the data received by the transmitting and receiving apparatus 3 is written in the memory 22 via the interface 24. In the reproduction mode, the control circuit 25 connects the switch SW1 to the terminal (b) of FIG. 4 and changes the mode of the memory 22 to the reading mode. Thus, the digital data stored in the memory 22 is read out from the memory 22 and converted to an analog signal by the D-A converter 23 so as to be provided as an aural signal from the microphone-speaker 26.

Figure 5:
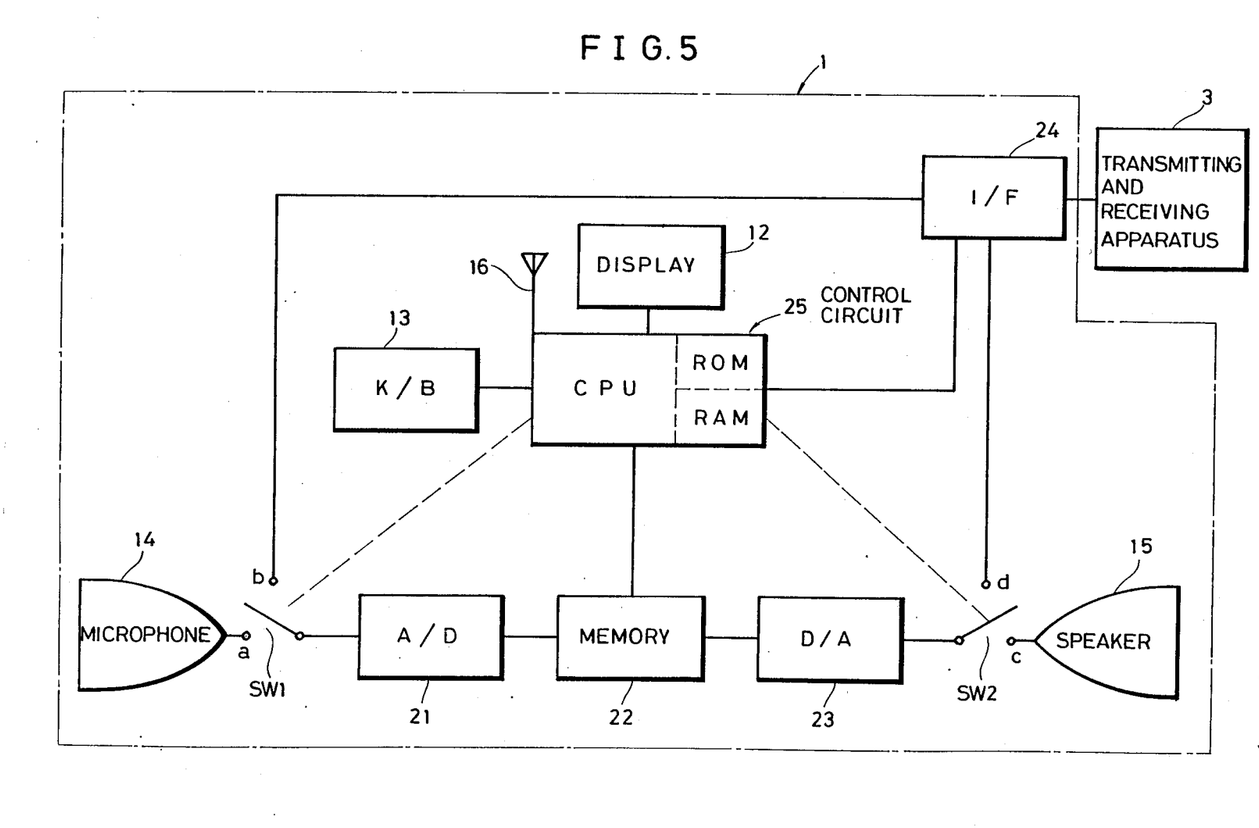
FIG. 5 is a schematic block diagram where a card of an embodiment of the present invention is adapted to communicate with an external transmitting and receiving apparatus in the form of analog data.

FIG. 5 is a schematic block diagram of another embodiment of this invention, and is different from the embodiment shown in FIG. 3. In the case of FIG. 3, the data communicated between the interface 24 and the transmitting and receiving apparatus 3 is digital data, while in FIG. 5, communication of analog data can be made therebetween. More specifically stated, in the case of FIG. 5, the digital data stored in the memory 22 is converted to analog data by the D-A converter 23 so as to be transmitted to the interface 24 via the terminal (d) of the switch SW2 or the analog data received by the interface 24 is converted to digital data by the A-D converter 21 via the terminal (b) of the switch SW1 so as to be stored in the memory 22.

Table 3 shows the relation between the states of the switches SW1 and SW2 and the modes of the memory 22 in the case of FIG. 5.

TABLE 3

|  | SW1 | Memory | SW2 |
|---|---|---|---|
| Recording | a ON | Writing | OFF |
| Transmission | OFF | Reading | d ON |
| Receiving | b ON | Writing | OFF |
| Reproduction | OFF | Reading | ON |

In the recording mode, the control circuit 25 makes control so that the switch SW1 is connected to the terminal (a) of FIG. 5, the memory 22 is brought into the writing mode and the switch SW2 is turned off. Thus, voice input information is converted to an analog electric signal through the microphone 14 and further converted to a digital signal by the A-D converter so as to be written in the memory 22. In the transmission mode, the control circuit 25 turns on the switch SW1, changes the mode of the memory 22 to the reading mode and connects the switch SW2 to the terminal (d) of FIG. 5. Thus, the digital data stored in the memory 22 is read out from the memory 22 and converted to analog data by the D-A converter 23 so as to be transmitted to the transmitting and receiving apparatus 3 via the interface 24. In the receiving mode, the control circuit 25 connects the switch SW1 to the terminal (b) of FIG. 5, selects the writing mode for the memory 22 and turns off the switch SW2. In consequence, the analog data received by the transmitting and receiving apparatus 3 is converted to digital data by the A-D converter via the interface 24 so as to be written in the memory 22. In the reproduction mode, the control circuit 25 turns off the switch SW1, selects the reading mode for the memory 22 and connects the switch SW2 to the terminal (c) of FIG. 5. Thus, the digital data stored in the memory 22 is read out from the memory 22 and converted to an analog signal by the D-A converter so as to be provided as an aural signal from the speaker 15.

Figure 6:
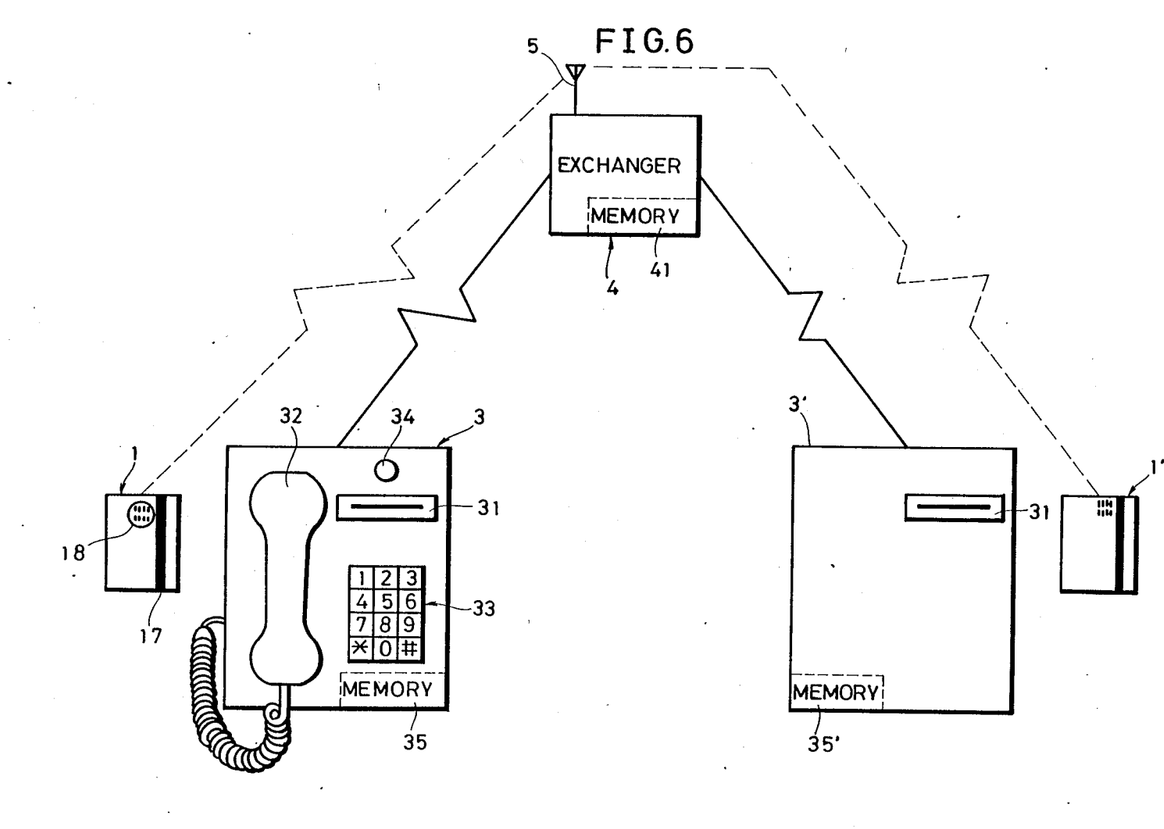
FIG. 6 shows a system where a card of the present invention is applied.

FIG. 6 shows an example of a system in which a card of the present invention is applied. The transmitting and receiving apparatus 3 has a handset 32 and a ten-key 33 and serves also as an ordinary push-button telephone. The transmitting and receiving apparatus 3 includes a card entrance 31 and an indication lamp 34. When the card 1 where a message or the like has been recorded is inserted into the entrance 31, the contact 18 on the back surface of the card 1 comes in touch with a contact element (not shown) in the transmitting and receiving apparatus 3. As a result, the content of the message or the like recorded in the card 1 can be communicated through the transmitting and receiving apparatus 3. The indication lamp 34 serves to indicate the operation state of the transmitting and receiving apparatus 3. For example, the indication lamp 34 blinks during the transmission or reception of the message or it is turned on when the transmission or reception by the card is completed. The transmitting and receiving apparatus 3 is connected to an exchanger 4 via a telephone line. The exchanger 4 comprises a memory 41 for storing the message data transmitted from the card 1 via the transmitting and receiving apparatus 3. When the card 1' of the person on the receiving side is inserted into a transmitting and receiving apparatus 3 on the receiving side, the exchanger 4 is accessed so that the message data recorded in the memory 41 of the exchanger 4 is transmitted to the card 1'. The handset 32, the ten key 33 and the like in the transmitting and receiving apparatus 3 may be omitted in the case of communication using the card 1. A transmitting and receiving apparatus not provided with these components is shown by the reference character 3'.

Figure 11:
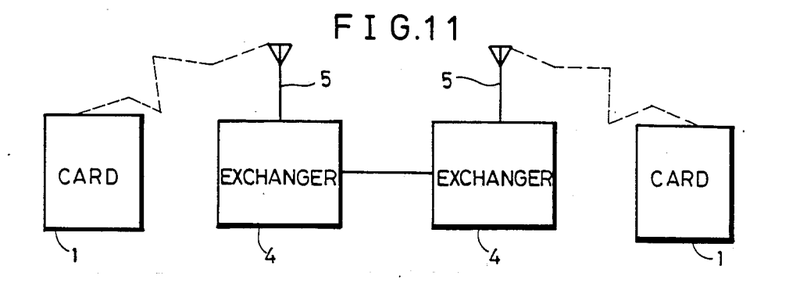
FIG. 11 is a flow chart showing a system for radio communication using cards.

Instead of the exchanger 4, a telephone 3 or 3' of the one's own residence may be used to store the content of a message. A memory device of a transmitting and receiving apparatus 3 or 3' provided for that purpose is indicated as a memory 35 or 35'. In this case, if a transmitting and receiving apparatus provided with a handset 32 is used, it is made possible to confirm only the message by taking up the handset. In a transmitting and receiving apparatus not provided with a handset, presence of a message can be confirmed by inserting therein the card 1 where the telephone number of the person on the receiving side is stored. In addition, instead of the exchanger 4, a message communication center or the like may be provided for the purpose of storing messages. Further, since the telephone number or the like of the user is registered in the card 1, only the registered number can be utilized so that a telephone call may be made by inserting the card 1 into the transmitting and receiving apparatus 3. In addition, the exchanger 4 includes an antenna 5 for receiving an emergency signal from a card on the transmitting side and transmitting a call signal to a card on the receiving side. The antenna 5 is used also as a relay station for radio communication by cards, as shown in FIG. 11 to be described later.

Figure 7A:
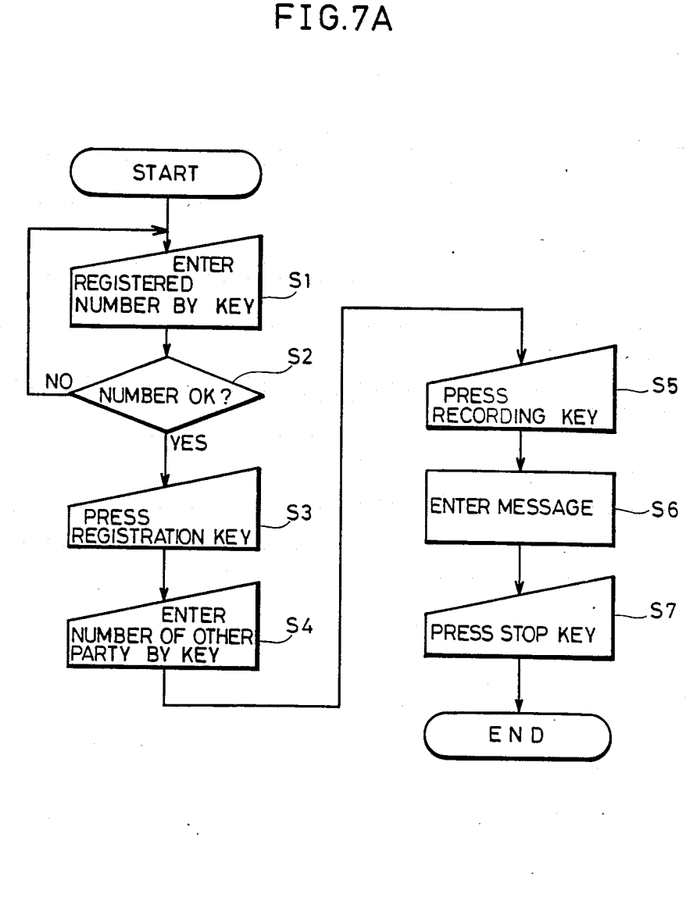
FIG. 7A is a flow chart showing the procedures for entering a message into a card.

FIG. 7A is a flow chart showing the procedures for entering a message in the card 1 shown in FIG. 1. Now, referring to FIGS. 1 through 7A, the procedures for entering a message into the card 1 will be described. The person entering a message first presses the ten-key of the card 1 to enter the registered number such as his telephone number or the like (in step S1). The registered number is a kind of secret number. The entry of the registered number serves to prevent his own card from being freely used by others. Since the registered number has been stored in the memory 22 of the card 1, the entered number is checked with the stored registered number by the control circuit 25 in the card 1 (in step S2). If the result of the check shows inconsistency between the numbers on account of an error in entry, for example, the user enters again the registered number. If the result of the check is successful, the user depresses a registration mode designating key of the card 1 (in step S3) and enters the telephone number of the other party by using the ten-key (in step S4). Subsequently, he depresses a recording mode designating key (in step S5) and gives a message toward the microphone (in step S6). After the entry of the message he depresses a stop key (in step S7) to end the recording.

Figure 7B:
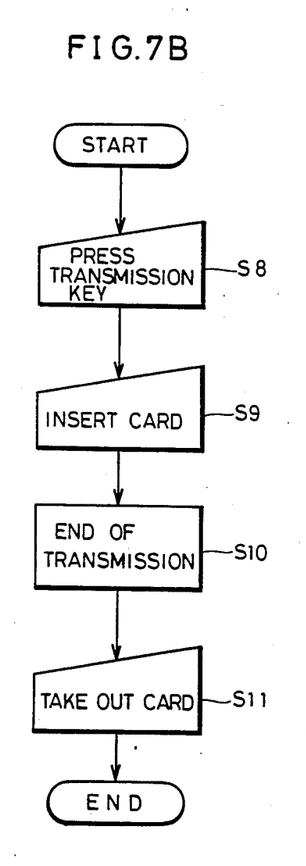
FIG. 7B is a flow chart showing the procedures for transmitting a message using a card.

FIG. 7B is a flow chart showing the procedures for transmitting the message entered in the card. Referring to FIGS. 1 through 7B, the procedures for transmitting the message entered in the card will be described. First, the user depresses a transmission mode designating key of the card 1 (in step S8). Then, he inserts the card 1 into the card entrance 31 of the transmitting and receiving apparatus 3 shown in FIG. 6 (in step S9). The contact 18 of the card 1 comes in touch with the contact element in the transmitting and receiving apparatus and as a result, the content of the message stored in the memory 22 is transmitted. The data to be transmitted is the registered number such as the telephone number on the transmitting side, the message and the telephone number on the receiving side. The transmitted data is stored in the memory 41 of the exchanger 4, for example, shown in FIG. 6. After the completion of the transmission (in step S10), the indication lamp of the transmitting and receiving apparatus is turned on for example and the card 1 is taken out (in step S11).

Figure 7C:
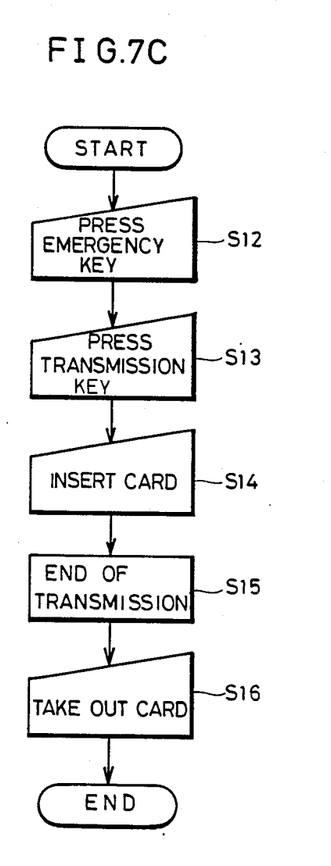
FIG. 7C is a flow chart showing the procedures for emergency communication.

FIG. 7C is a flow chart showing the procedures for emergency communication. Referring to FIGS. 1 through 7C, the procedures for emergency communication will be described. First, the user of the card 1 depresses an emergency mode designating key of the card 1 (in step S12). The subsequent procedures are the same as in the case of FIG. 7B, except that in the case of emergency communication, a call is issued to the card on the other side by radio from the exchanger 4 or a message communication center separately provided. When the card on the other side senses the radio call through the antenna 16, the speaker emits a call sound. Then, the owner of the card on this side inserts the card 1 into a transmitting and receiving apparatus 3 existing near by and thus he can receive the message. The reception of the message will be described below with reference to FIG. 8.

Figure 8:
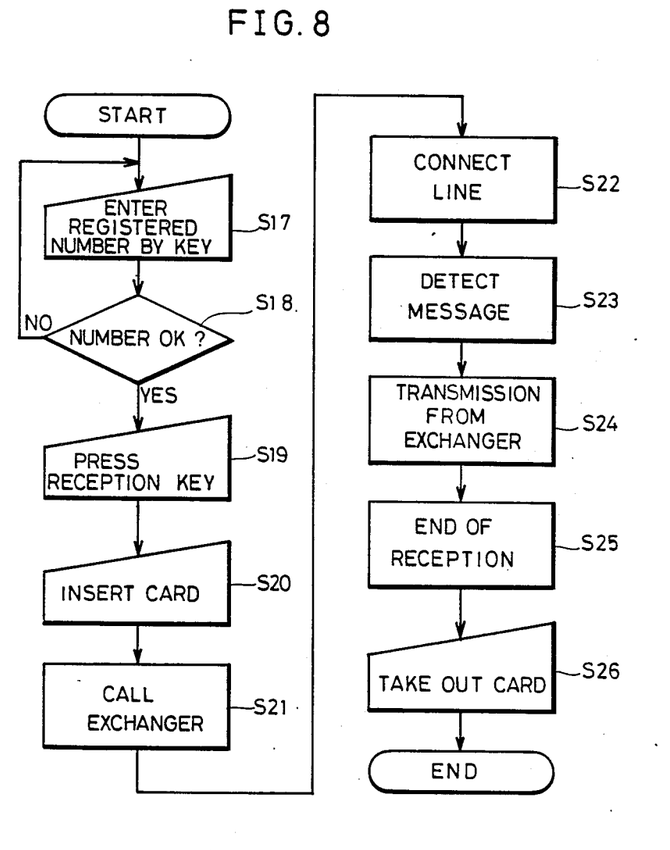
FIG. 8 is a flow chart showing the procedures for receiving a message.

FIG. 8 is a flow chart showing the procedures for receiving a message. Referring to FIGS. 1 through 8, the procedures for receiving a message will be described in the following. The person on the receiving side first enters the registered number such as his telephone number in the same manner as in the case of entry of a message shown in FIG. 7A (in step S17). If the result of the check by the control circuit 25 is successful, he depresses a receiving mode designating key (in step S19). Then, he inserts the card 1 into the card entrance 31 of the transmitting and receiving apparatus 3 or 3' shown in FIG. 6 (in step S20). The transmitting and receiving apparatus 3 or 3' makes a call to exchanger 4 (in step S21) and subsequently connects the exchanger 4 to the line (in step S22). The exchanger 4 searches for the corresponding message data in the memory 41 based on the telephone number transmitted from the card on the receiving side (in step S23). If the corresponding message data exists, it is transmitted from the exchanger 4 to the card on the receiving side (in step S24). The card stores the message data in the memory 22. After the completion of the reception (in step S25), the card is taken out of the transmitting and receiving apparatus 3 (in step S26) and thus the procedures come to an end.

The message data stored in the memory 41 of the exchanger 4 may be automatically erased when the reception by the card is completed. Further, in case where the card does not operate for reception within a given period, it is desirable to erase the message data stored in the memory 41 of the exchanger 4. This is because the storage capacity of the memory 41 is limited.

Figure 9:
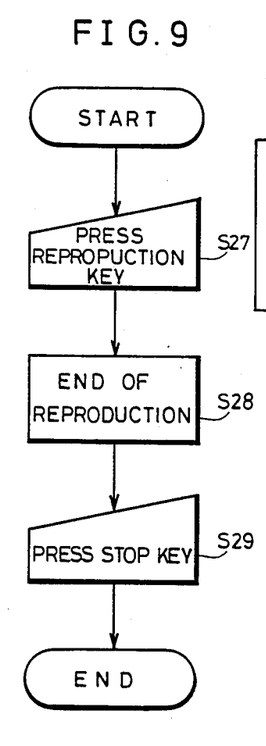
FIG. 9 is a flow chart showing the procedures for reproducing the received message.

FIG. 9 is a flow chart showing the procedures for listening to the message received from the other party or confirming the message entered by the user himself. In the following, the procedures for listening to the message recorded in the card will be described with reference to FIGS. 1 through 9. In order to listen to the message, the user of the card 1 first depresses a reproduction mode designating key of the card 1 shown in FIG. 1 (in step S27). Consequently, the control circuit 25 of the card 1 converts the message data digitally recorded in the memory 22 to analog data by the D-A converter 23 so that the message is reproduced as an aural signal from the speaker 15. After the completion of the reproduction (in step S28), he depresses the stop key (in step S29). Reproduction can be made many times. Further, the telephone number of the person on the other side may be displayed on the display 12 of the card 1 at the time of reproduction.

Figure 10:
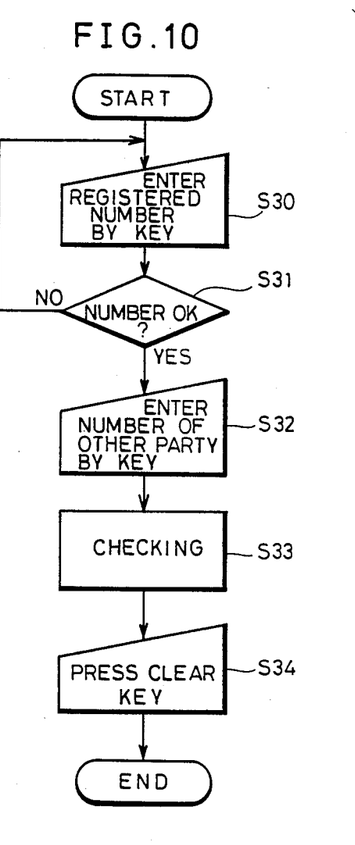
FIG. 10 is a flow chart showing the procedures for erasing the message recorded in a card.

FIG. 10 is a flow chart showing the procedures for erasing the content stored in the card. In the following, the procedures for erasing the content stored in the card will be described with reference to FIGS. 1 through 10. First, the user of the card enters the registered secret number using the key (in step S30) in the same manner as in the case of entering or receiving a message. This step is for the purpose of confirming coincidence between the secret number and the number stored in advance in the memory 22 so as to prevent the stored data from being erased freely by others. If these numbers coincide, he enters the telephone number of the person on the other side using the key. The control circuit 25 of the card 1 checks the data stored in the memory 22 with entered telephone number of the person on the other side (in step S33) so that the corresponding data is erased when the clear key of the keyboard 13 is depressed (in step S34).

Using these cards, communication by radio can be made.

FIG. 11 shows an example of a system for making communication by radio. As shown in FIG. 11, the owners of the cards can communicate with each other through an exchanger provided nearby.

Figure 12:
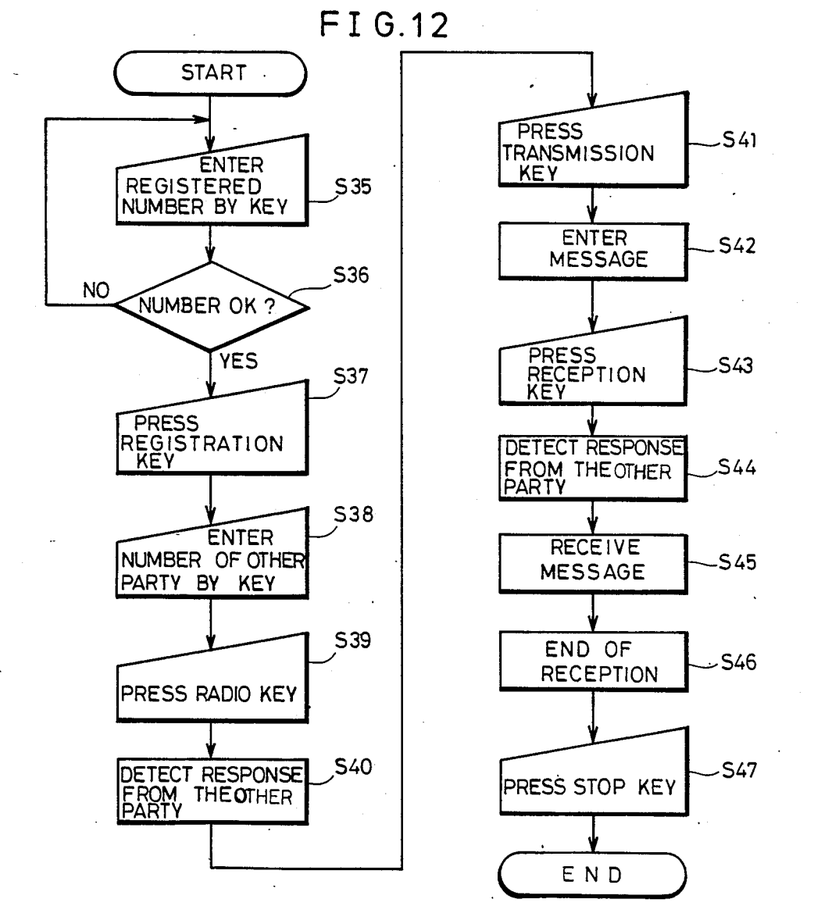
FIG. 12 is a flow chart showing the procedures for making communication by radio using the system shown in FIG. 11.

FIG. 12 shows procedures for radio communication using the system shown in FIG. 11. The following description will be given to these procedures for communication by radio with reference to FIGS. 11 and 12. The owner of the card on one side enters the registered number such as his telephone number using the key (in step S35) in the same manner as in the case of entering a message. If the entered registered number coincides with the beforehand recorded number, he depresses the registration mode designating key of the card 1 (in step S37). Subsequently, he enters the number of the person on the other side using the key (in step S38) and depresses the radio mode designating key (in step S39). A call signal is emitted from the antenna 16 of the card 1 and attains the card of the person on the other side via the exchanger 4 and a response signal is emitted from the card of the person on the other side. When the card on the transmitting side detects the response signal from the other side (in step S40), the person on the transmitting side depresses the transmission mode designating key (in step S41). Then, he enters a message through the microphone 14 (in step S42). Subsequently, when he depresses the receiving mode designating key (in step S43), the receiving mode is selected. Then, a response signal from the card on the other side is detected (in step S44) and the transmitted message is received (in step S45). If there is not any more message to be transmitted after the reception, he depresses the step key (in step S47).

Further, as described previously in connection with FIG. 2, the card 1 may be used also as bank card.

Figures 13, 14:
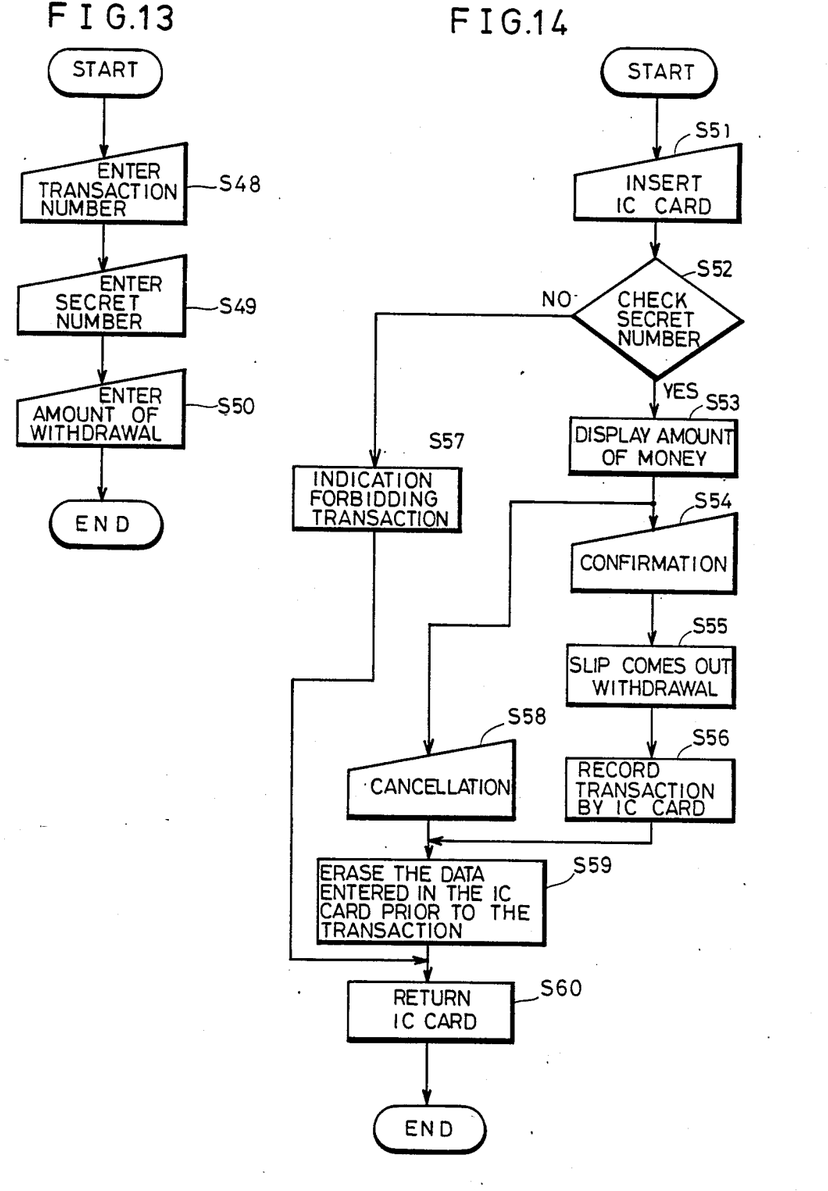
FIG. 13 is a flow chart showing the entry of data prior to the transaction processing by an automatic teller machine or the like installed at a bank.
FIG. 14 is a flow chart showing the procedures and processing operation for transaction processing using the card in which necessary data has been entered in advance as shown in FIG. 13.

FIG. 13 shows the procedures for entering necessary information into the card prior to transaction. In the following, the procedures for entering necessary information prior to transaction will be described. First, a transaction number is entered by the ten key of the card 1 (in step S48). The transaction number is a number representing the kind of transaction processing such as withdrawal, deposit or transfer. Subsequently, a secret number is entered (in step S49). The secret number is a predetermined number for specifying the account he has with the bank. Then, if withdrawal is selected as the transaction processing, the amount of withdrawal is entered (in step S50). The entered data are stored in the memory 22 of the card 1.

FIG. 14 shows the procedures and processing operation for performing transaction by an automatic teller machine installed at a bank and the like by utilizing a card where transaction data has been entered according to the flow chart of FIG. 13. These procedures and processing operation will be described in the following. A card reader of the automatic teller machine used in this example includes a contact element corresponding to the contact 18 of the card 1 so that communication of information may be made with the card. Although the automatic teller machine may be adapted to perform transaction processing based on the data read out from the card, transaction processing may be performed together with the card where a program for transaction processing has been stored in the memory. In the latter case, a transaction processing program is stored in the ROM of the control circuit 25 of the card 1 and as the CPU, a high-performance unit for transaction processing is used. Since the storage capacity of the card needs to be large, an integrated circuit is preferably adopted. In the following description, the card of this invention is referred to as an IC card.

The customer first depresses the transaction mode designating key of the card. Subsequently, he inserts into the automatic teller machines, the IC card where necessary information has been entered according to the procedures shown in the flow chart of FIG. 13 (in step S51). The IC card is connected to the automatic teller machine through the contact 18 of the card. In consequence, the CPU of the card performs transaction processing according to the transaction processing program stored in the ROM. The CPU of the IC card checks the secret number entered prior to transaction as shown in FIG. 13 with the secret number registered in advance (in step S52). This checking may be done by comparison between the secret number entered prior to the transaction and the secret number stored in the magnetic stripe 17. If these numbers do not coincide, an indication for forbidding transaction is given (in step S57) and the IC card comes out (in step S60), whereby the operation is ended. If the numbers are coincident, the program proceeds to step S53, where an amount of withdrawal is indicated in the display of the automatic teller machine. The customer confirms the amount of withdrawal and if he wants the transaction, he depresses the confirmation key of the keyboard of the automatic teller machine (in step S54). If the customer wants to change the amount or stop the transaction, he depresses the cancellation key (in step S58). When the confirmation key is depressed, a payment slip together with the money is sent out (in step S55) and the amount of transaction is stored in the memory of the IC card (in step S56). Subsequently, the data entered in the IC card prior to the transaction is erased (in step S59) and the IC card is sent out (in step S60) and thus, the operation is completed. If the cancellation key is depressed after the indication of the amount in step S53, the program proceeds to the step S59 and the steps subsequent thereto as described above.

In addition, as described previously in connection with FIG. 1, the IC card 1 serves also as an electronic calculator and can be used for calculation of daily shopping or housekeeping costs.

According to the present invention, a message to be transmitted is recorded in advance in a card and when the card is inserted into a transmitting and receiving apparatus, the message can be transmitted. Even if the person on the receiving side is not at home or at the office, the message can be given at any time. In addition, in case of emergency, an emergency call can be issued to the person on the receiving side. The owner of the card can confirm from outside at any time by inserting the card to a public telephone or the like existing nearby, whether or not there is a message addressed to him. Further, since the telephone number or the like of the owner is registered in the card, the telephone charge is automatically counted in the telephone company whenever a message is transmitted from a public telephone using the card. Thus, even without cash, a message can be transmitted. If the content of a message is communicated in the form of a digital signal, the data can be compressed and accordingly, transmission and reception thereof can be made in an instant, which makes is possible to smoothly use a public telephone and the like without causing a crowded state around the telephone. If the card has a function as an electronic calculator, it is convenient for calculation of the amounts of money in daily shopping and other cases. Thus, the opportunities to carry the card will be enlarged and these cards will be widely used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voice recording card for use in a transmitting and receiving apparatus, comprising:
   a recording mode designating means for designating a voice recording mode;
   voice input converting means being enabled in response to an input by said sound recording mode designating means for converting voice input information into an electric signal;
   first storing means for storing the voice information from said voice input converting means; and
   interface means for transmitting the information stored in said first storing means to the transmitting and receiving apparatus.

2. A voice recording card as set forth in claim 1, which further comprises analog-to-digital converting means for converting an analog signal entered by said voice input converting means to a digital signal, and
   said first storing means comprising a digital integrated circuit memory.

3. A voice recording card as set forth in claim 1, wherein
   said interface means is adapted to receive a signal from the transmitting and receiving apparatus and further includes a receiving contact to be connected with the transmitting and receiving apparatus, and;
   which further comprises:
      second storing means for storing a signal received from the transmitting and receiving apparatus through said interface means,
      a reproduction mode designating means for designating a voice reproduction mode, and
      voice output converting means being enabled in response to an input by said reproduction mode designating means for converting the received information stored in said second storing means to a voice, which is provided as output.

4. A voice recording card as set forth in claim 3, wherein
   said second storing means comprises a digital integrated circuit memory, and
   which further comprises:
      digital-to-analog converting means for converting digital data stored in said second storing means to analog data.

5. A voice recording card as set forth in claim 1, which further comprises a keyboard having at least a ten key for entering information of the telephone number of a person to whom transmission is made by means of the transmitting and receiving apparatus or information of one's own telephone number.

6. A voice recording card as set forth in claim 3, which further comprises antenna means for receiving a call signal by radio, and
   said voice output converting means providing a call sound in response to the reception of the call signal by said antenna means.

7. A voice recording card for use in a transmitting and receiving apparatus, comprising:
   voice input converting means for receiving a voice signal and converting said voice signal to an analog, electric signal,
   analog-to-digital converting means for converting analog data received from said voice input converting means to digital data,
   storing means for storing the digital data 10 converted by said analog-to-digital converting means,
   interface means provided for making a bidirectional communication of the digital data between said storing means and the transmitting and receiving apparatus, first connecting means for making said voice input converting means conducted to or interrupted from an analog input terminal of said analog-to-digital converting means, digital-to-analog converting means for converting the digital data stored in said storing means, voice output converting means for converting the received analog data to a voice, second connecting means for making an analog output terminal of said digital-to-analog converting means conducted to or interrupted from said voice output converting means, a recording mode designating means for designating a voice recording mode, a reproduction mode designating means for designating a reproduction mode, a transmission mode designating means for designating a mode of transmission to the transmitting and receiving apparatus, a reception mode designating means for designating a mode of reception from the transmitting and receiving apparatus, and control means for
conducting said first connecting means and interrupting said second connecting means in response to the input by said recording mode designating means, interrupting said first connecting means and conducting said second connecting means in response to the input by said reproduction mode designating means, interrupting said first and second connecting means in response to the input by said transmission mode designating means and sending the voice input digital data stored in said storing means to means transmitting and receiving apparatus via said interface means, and interrupting said first and second connecting means in response to the input by said reception mode designating means and storing the data received from the transmitting and receiving apparatus via said interface means into said storing means.

8. A voice recording card as set forth in claim 7, wherein said voice input converting means and said voice output converting means are a microphone-speaker formed as a single body.

9. A voice recording card for use in a transmitting and receiving apparatus, comprising:

voice input converting means for entering an aural signal and converting said aural signal to an analog electric signal, analog-to-digital converting means for converting analog data received from said voice input converting means to digital data, storing means for storing the digital data converted by said analog-to-digital converting means, interface means provided for making a bidirectional communication of analog data between said storing means and the transmitting and receiving apparatus, first connecting means for connecting an analog input terminal of said analog-to-digital converting means selectively to either said voice input converting means or said interface means, digital-to-analog converting means for converting the digital data stored in said storing means to analog data, voice output converting means for converting the received analog data to an aural signal, second connecting means for connecting an analog output terminal of said digital-to-analog converting means selectively to either said interface means or said voice output converting means, a recording mode designating means for designating a voice recording mode, a reproduction mode designating means for designating a reproduction mode, a transmission mode designating means for designating a mode of transmission to the transmitting and receiving apparatus, a reception mode designating means for designating a mode of reception from the transmitting and receiving apparatus, and control means for making control so that:
in response to an input by said recording mode designating means, said first connecting means connects said voice input converting means and said analog-to-digital converting means and said second connecting means is brought into an idle state, in response to an input by said reproduction mode designating means, said first connecting means is brought into an idle state and said second connecting means connects said digital-to-analog converting means and said voice output means, in response to an input by said transmission mode designating means, said first connecting means is brought into an idle state and said second connecting means connects said digital-to-analog converting means and said interface means and the voice input digital data stored in said storing means is converted to analog data by said digital-to-analog converting means so as to be sent to the transmitting and receiving apparatus via said interface means, and in response to an input by said reception mode designating means, said first connecting means connects said interface means and said analog-to-digital converting means, the analog data received via said interface means from the transmitting and receiving apparatus is converted by said analog-to-digital converting means to digital data to be stored in said storing means and said second connecting means is brought into an idle state.

10. A voice recording card as set forth in claim 1 wherein said interface means has a transmitting contact to be connected with said transmitting and receiving apparatus.

11. A voice recording card as set forth in claim 1 wherein said recording mode designating means in a key.

12. A voice recording card as set forth in claim 7 wherein said interface means has a contact to be connected with the transmitting and receiving apparatus.

13. A voice recording card as set forth in claim 7 wherein said designating means are keys.

14. A voice recording card as set forth in claim 9 wherein said interface means has a contact to be connected with the transmitting and receiving apparatus.

15. A voice recording card as set forth in claim 9 wherein said designating means are keys.

* * * * *